US012600098B2

(12) United States Patent
Albouy et al.

(10) Patent No.: US 12,600,098 B2
(45) Date of Patent: Apr. 14, 2026

(54) VANE MADE OF COMPOSITE MATERIAL COMPRISING A METALLIC REINFORCEMENT AND METHOD FOR MANUFACTURING SUCH A VANE

(71) Applicant: SAFRAN, Paris (FR)

(72) Inventors: William Albouy, Moissy-Cramayel (FR); Pierre-Antoine Bossan, Moissy-Cramayel (FR); Justine Delozanne, Moissy-Cramayel (FR); Pierre Francois Robin Geraud-Grosheny, Moissy-Cramayel (FR); Jerome Olhagaray, Moissy-Cramayel (FR); Marc Waris, Moissy-Cramayel (FR)

(73) Assignee: SAFRAN, Paris (FR)

( * ) Notice: Subject to any disclaimer, the term of this patent is extended or adjusted under 35 U.S.C. 154(b) by 83 days.

(21) Appl. No.: 18/684,142

(22) PCT Filed: Sep. 5, 2022

(86) PCT No.: PCT/FR2022/051674
§ 371 (c)(1),
(2) Date: Feb. 15, 2024

(87) PCT Pub. No.: WO2023/037068
PCT Pub. Date: Mar. 16, 2023

(65) Prior Publication Data
US 2024/0239062 A1 Jul. 18, 2024

(30) Foreign Application Priority Data
Sep. 13, 2021 (FR) ...................................... 2109569

(51) Int. Cl.
B29C 70/68 (2006.01)
B29C 70/54 (2006.01)
(Continued)

(52) U.S. Cl.
CPC ............ B29C 70/682 (2013.01); B29C 70/70 (2013.01); B29K 2705/00 (2013.01);
(Continued)

(58) Field of Classification Search
CPC .... B29C 70/546; B29C 70/547; B29C 70/682
See application file for complete search history.

(56) References Cited

U.S. PATENT DOCUMENTS

| | | | |
|---|---|---|---|
| 7,473,385 B2 * | 1/2009 | Stiesdal | ................ F03D 1/0675 264/258 |
| 2007/0092379 A1 | 4/2007 | Coupe et al. | |

(Continued)

FOREIGN PATENT DOCUMENTS

| | | |
|---|---|---|
| EP | 3486432 A1 | 5/2019 |
| FR | 3102086 A1 | 4/2021 |

OTHER PUBLICATIONS

International Search Report received for PCT Patent Application No. PCT/FR2022/051674, mailed on Dec. 22, 2022, 7 pages (3 pages of English Translation and 4 pages of Original Document).

*Primary Examiner* — Matthew J Daniels
(74) *Attorney, Agent, or Firm* — WOMBLE BOND DICKINSON (US) LLP

(57) ABSTRACT

A method for manufacturing a vane made of composite material for a turbomachine, including the steps of three-dimensional fibre weaving and producing a fibrous preform, reinforcing an edge of the preform intended to form a leading edge of a blade of the vane, by integrating a metallic reinforcement on this edge, mounting the preform and the reinforcement in a mould, densifying the preform by a matrix to form the vane, wherein, prior to the integration of the reinforcement, the method includes a step of introducing at least one reinforcement support configured to be inter-posed between the reinforcement and the edge, and wherein at the densification step, the support is enveloped with the (Continued)

matrix to bond the edge and the reinforcement with a predefined and homogeneous minimum thickness.

14 Claims, 12 Drawing Sheets

(51) Int. Cl.
   *B29C 70/70*          (2006.01)
   *B29K 705/00*        (2006.01)
   *B29L 31/08*         (2006.01)
(52) U.S. Cl.
   CPC ................. *B29K 2995/0077* (2013.01); *B29K 2995/0097* (2013.01); *B29L 2031/08* (2013.01)

(56)                  References Cited

U.S. PATENT DOCUMENTS

| | | | |
|---|---|---|---|
| 2009/0074586 | A1 | 3/2009 | Le Hong et al. |
| 2011/0194941 | A1* | 8/2011 | Parkin ................... F04D 29/023 |
| | | | 416/224 |
| 2020/0307162 | A1* | 10/2020 | Remy ..................... B32B 3/266 |
| 2021/0010377 | A1 | 1/2021 | Blanquart et al. |

* cited by examiner

···Seal thickness of 0,20mm
～～Seal thickness of 0,40mm
·ᴗ～Seal thickness of 0,60mm Curing cycle (in temperature T°C)

180

2

Time (in hours)

VANE MADE OF COMPOSITE MATERIAL COMPRISING A METALLIC REINFORCEMENT AND METHOD FOR MANUFACTURING SUCH A VANE

TECHNICAL FIELD

The invention relates to the field of vanes made of composite material for a turbomachine, in particular for an aircraft, and more specifically to the improvement of the mechanical strength of such a vane made of composite material.

TECHNICAL BACKGROUND

The prior art comprises in particular the documents FR-A1-3102086, US-A1-2021/010377, US-A1-2009/074586, EP-A1-3486432 and US-A1-2007/092379.

Turbomachines are known, in particular double flow turbomachines, comprising a fan arranged upstream of a gas generator depending on the circulation of the gases in the turbomachine. The gas generator is housed in an internal annular casing, while the fan is housed in an outer annular casing, generally secured to a nacelle. The fan generates a primary flow or hot flow circulating in a primary duct passing through the gas generator, and a secondary flow or cold flow circulating in a secondary duct around the gas generator.

These primary and secondary ducts are separated by an annular inter-duct casing provided with a splitter nose. The fan comprises fan vanes each with a free end facing the outer casing so as to compress an incident air flow at least in the secondary duct and, preferably, also in the primary duct.

Typically, downstream of the fan, the secondary duct comprises a stage of stator vanes, also referred to as flow straightener vanes or outlet guide vanes (OGV). These OGV vanes are evenly distributed around the axis of rotation of the fan and arranged radially from the axis of rotation of the fan, downstream of the fan vanes. The function of an OGV vane is to straighten the flow at the outlet of a fan vane into the secondary flow of the turbomachine.

The OGV vanes form rows of stationary vanes that allow to guide the flow through the turbomachine at an appropriate speed and angle.

FIG. 1 shows an OGV vane 10 which comprises a blade 12 having an intrados face 18 and an extrados face 28 extending between a leading edge 14 and a trailing edge 16. The longitudinal ends of an OGV vane are connected to platforms: inter-OGV platforms 20 fitted to the radial outer end of the blade 12, and which are arranged between this OGV vane and the adjacent OGV vanes, and a platform 22 fitted to a radial inner end of the blade 12, and connected to a hub 24 of the annular internal casing.

The OGV vanes can be made of metal or a composite material, such as an organic matrix composite (OMC), in particular to reduce weight.

A commonly used composite material comprises a fibrous preform embedded in a polymeric resin. The fibrous preform may be the result of a three-dimensional (3D) weave or may be obtained by draping and superimposing several layers/plies (multilayer). The resin can be injected into the fibre preform or the fibre preform can be pre-impregnated with the resin (also referred to as "pre-impregnated").

One known manufacturing method for manufacturing composite OGV vanes is the RTM (Resin Transfer Molding) liquid resin injection moulding method. This involves making a fibrous preform, then placing this preform in a mould and densifying the fibrous preform with a polymer matrix, which consists of impregnating the fibrous preform with a resin and polymerising the latter to obtain the final part.

In addition, in order to protect the leading edge from erosive wear and/or damage caused by impacts with foreign bodies, it is covered by a protective shield or metallic reinforcement 30. The reinforcement 30, in the form of a metallic foil (e.g. Nickel-Cobalt or titanium alloy), is co-injected onto the portion of the leading edge 14 of the blade 12. More specifically, the reinforcement 30 is assembled and attached to an edge of the fibrous preform intended to form the leading edge 14 of the OGV vane, by bonding. To this end, the edge of the fibrous preform or the metallic reinforcement 30 is coated with a strip of adhesive 40, then the metallic reinforcement 30 is assembled on the edge of the fibrous preform of the OGV vane (FIG. 2a). The assembly is then placed in a mould and subjected to a thermal treatment. The injected resin impregnates the fibrous preform and comes into contact with the metallic reinforcement to ensure that the metallic reinforcement is secured to the preform after polymerisation and curing.

However, the use of adhesive, in strip or film form, to join a metallic part to a fibrous matrix creates stresses in the manufacturing operations, such as:

the adhesive has a service life limited to a few days at room temperature and must therefore be stored at a temperature below −18° C., placing the adhesive between the edge of the fibrous preform and the metallic reinforcement can be complex, particularly for complex geometries (dimensions and shape) of OGV vanes, a stage curing (or heating) cycle is necessary to ensure a good cohesion between the adhesive and the resin; the temperature of the first stage is between 100 and 160° C. and the second stage, in particular to cross-link the resin, at a temperature of 180° C. (FIG. 2b), risk of non-conformity of curing cycles and therefore scrapping of the non-conforming assembly, and adhesive is an expensive material.

The adhesive performance depends on the chemical nature of the adhesive, the substrates used, surface treatments and adhesive thickness. The resin used in the co-injection of the method for manufacturing the OGV vane described above is generally of the same chemical nature as the adhesive currently used.

In order to improve the method for manufacturing the vane, it has been tried to bond the metallic reinforcement 30 directly to the leading edge 14 of the fibrous preform using polymeric resin 50. However, the bonding by the resin 50 is heterogeneous between the metallic reinforcement 30 and the leading edge 14 in the absence of the adhesive. With reference to FIG. 3, different thicknesses of resin are observed on the assembly interface, in particular an absence of resin on certain interface areas Z1 between the leading edge 14 and the metallic reinforcement 30 and an excess of resin on other interface areas Z2 of the assembly. This heterogeneous configuration locally modifies the mechanical properties and weakens the bonding performance. The resin bonding is therefore insufficient and this can lead to premature failure of the metallic reinforcement/vane leading edge assembly.

There is therefore a need to provide a manufacturing method that allows to improve the quality of bonding of the metallic reinforcement to the leading edge of a blade of composite material vane.

SUMMARY OF THE INVENTION

The present invention provides a simple, effective and economical solution to the aforementioned disadvantages of the prior art.

To this end, the invention relates to a method for manufacturing a vane made of composite material for a turbomachine, in particular an aircraft turbomachine, said vane comprising a blade having an intrados face and an extrados face extending between a leading edge and a trailing edge, the method comprising the step of:

weaving fibres in three dimensions so as to produce a fibrous preform, reinforcing an edge of said preform intended to form the leading edge of the blade, by integrating a metallic reinforcement on said edge of the preform, assembling the fibrous preform and the metallic reinforcement in a mould, densifying the fibrous preform by a matrix to form the vane composite material.

According to the invention, before the step of integrating the metallic reinforcement, the method comprises a step of introducing at least one reinforcement support onto the edge of the fibrous preform, said reinforcement support being configured so as to be interposed between the metallic reinforcement and said edge of the fibrous preform.

According to the invention, in the densification step, said reinforcement support is enveloped with the matrix to bond the edge of the fibrous preform and the metallic reinforcement with a predefined and homogeneous minimum thickness.

The reinforcement support allows the edge of the fibrous preform and the metallic reinforcement to be bonded effectively with a predefined minimum thickness, which can be substantially constant and homogeneous at the interface of the assembly. "Homogeneous" or "constant" thickness refers to the uniform and regular distribution of the constituent elements when the metallic reinforcement is bonded to the leading edge of the vane blade with a minimum thickness. This minimum thickness can be predefined according to the type of constituent elements of the bonding used in the manufacturing method. The constituent elements of the bonding include the polymerised resin (or densification matrix) and the reinforcement support.

The reinforcement support has a generally flat shape with a predetermined thickness. During the densification step, the polymeric resin hardens, covering the reinforcement support and securing the assembly (i.e. the metallic reinforcement and the edge of the fibrous preform). In this way, there can be no direct contact between the metallic reinforcement and the fibrous preform (such as the resin-free area Z1 mentioned above). This limits the propagation of cracks during mechanical stress during operation and prevents the partial or complete rupture or separation of the metallic reinforcement at the leading edge of the vane. This greatly optimises the mechanical properties of the bonded assembly.

The bonding using the method described in the invention is therefore achieved by controlling the minimum thickness required to secure the assembly and the propagation of cracks in the bonded assembly. In this way, the quality of the bond between the metallic reinforcement and the leading edge of the vane blade (without adhesive) is significantly reinforced.

In addition, the method according to the invention also has numerous advantages, such as:

elimination of the step of adding adhesive between the edge of the fibrous preform and the metallic reinforcement, elimination of an eventual step of machining the edge of the fibrous preform before the bonding of the metallic reinforcement, elimination of the step of the manual pairing carried out by an operator to bond the metallic reinforcement to the edge of the densified fibrous preform, elimination of the adhesive curing step for each new vane assembly, which is now carried out at the same time as the resin curing step, reduction in resin cross-linking time during the densification step, and application to any type of assembly between a composite part and a metallic part.

The invention may comprise one or more of the following characteristics, taken alone or in combination with each other:

the densification step comprises impregnating the fibrous preform with a resin and transforming the resin into a matrix by thermal treatment, the resin is injected into the fibrous preform before the densification step, or the fibrous preform is previously impregnated with the resin in the step of making the fibrous preform, the edge of the preform comprising an intrados wall and an extrados wall connected together by a ridge, said reinforcement support covering at least a portion of said intrados and extrados walls up to the ridge of the edge of the fibrous preform, the reinforcement support is made of a metallic material, for example copper or aluminium, or the reinforcement support is made of a fibrous material, for example Nylon 66, Polyester or glass fibre, the fibrous material is woven, non-woven or knitted, the reinforcement support has a minimum thickness of 50 μm, preferably the thickness is between 50 μm and 600 μm, at the end of the densification step, the reinforcement support has a maximum Young's modulus of 2500 MPa, preferably the Young's modulus is between 1000 and 2000 MPa and for example 1300 MPa, the resin is made from a thermosetting or thermoplastic material, for example based on epoxy, polyepoxide, polyimide, polybismaleimide, polyurethane, polyester or vinylester, in the densification step, the resin envelops and passes through the reinforcement support of fibrous material, in the densification step, the resin envelops the reinforcement support made of metallic material, the densification step is carried out with a curing cycle comprising a single temperature rise stage, for example at a temperature of is 180° C.

The invention also relates to a vane made of composite material for a turbomachine, in particular for an aircraft, produced by a manufacturing method according to the invention.

The invention also relates to a vane made of composite material for a non-shrouded (referred by the acronyms "propfan" or "open rotor") or shrouded fan, in particular for an aircraft, produced by a manufacturing method according to the invention.

The vane made of composite material obtained by the method of the invention can also be a stator vane of a compressor or a turbomachine turbine, in which the metallic reinforcement can be a metallic part secured to any segment of the vane (i.e. to a similar or different segment of the leading edge of the vane).

The present invention also relates to a turbomachine, in particular for an aircraft, comprising a vane made of composite material according to the invention.

The turbomachine can be an aircraft turbojet, turboprop or turboshaft engine.

BRIEF DESCRIPTION OF FIGURES

The invention will be better understood and other details, characteristics and advantages of the present invention will become clearer from the following description made by way of non-limiting example and with reference to the attached drawings, in which:

FIG. 9b is a schematic representation of a curing curve as a function of time for the assembly shown in FIG. 9a.

The elements having the same functions in the different embodiments have the same references in the figures.

DETAILED DESCRIPTION OF THE INVENTION

By convention, in the following description, the terms "longitudinal" and "axial" refer to the orientation of structural elements extending in the direction of a longitudinal axis. The terms "radial" or "vertical" refer to an orientation of structural elements extending along a direction perpendicular to the longitudinal axis. The terms "inner" and "outer", and "internal" and "external" are used in reference to a positioning with respect to the longitudinal axis. Thus, a structural element extending along the longitudinal axis comprises an inner face facing the longitudinal axis and an outer surface opposite its inner surface.

Figure 1:
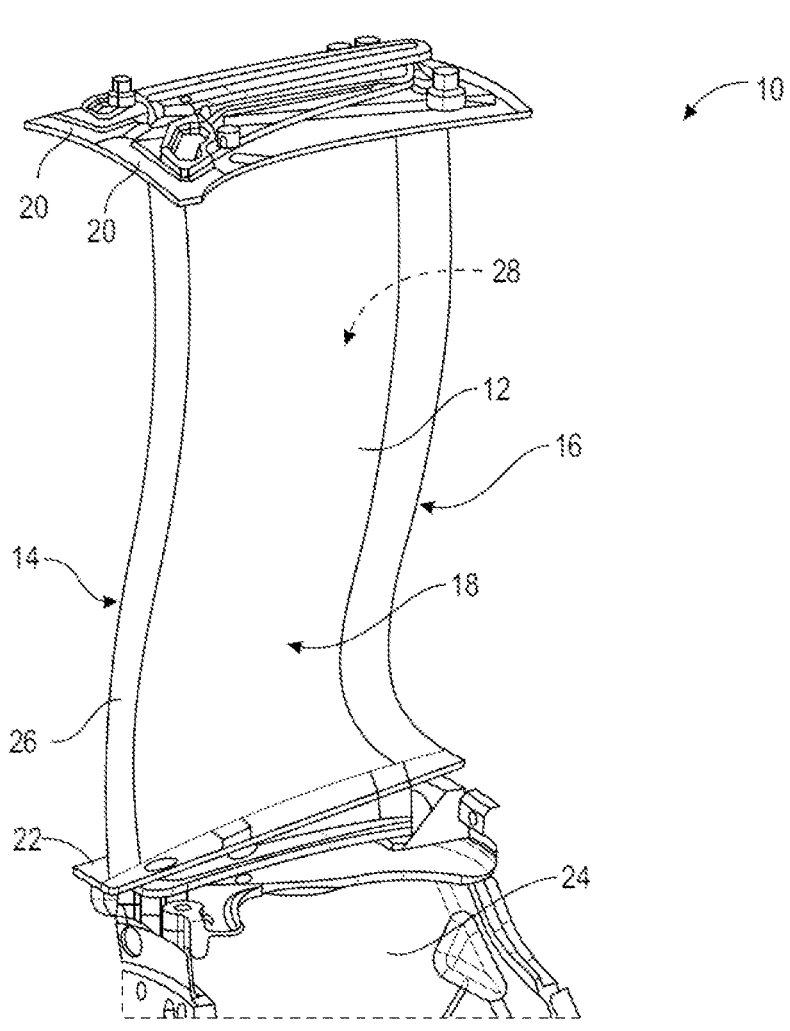
FIG. 1 is a schematic perspective view of a vane of a fan comprising a metallic reinforcement according to the prior art.
Figure 2A:
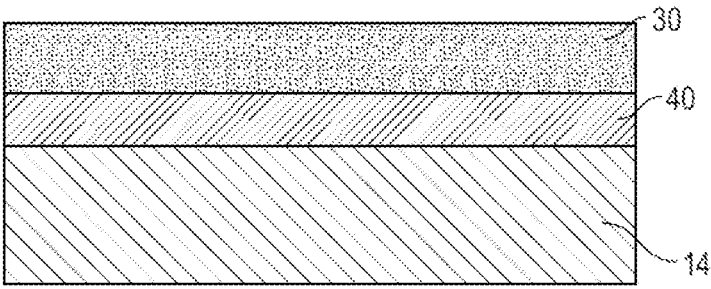
FIG. 2a is a schematic layered representation of a portion of the assembly of the metallic reinforcement and the leading edge of the vane with an adhesive of FIG. 1.
Figure 2B:
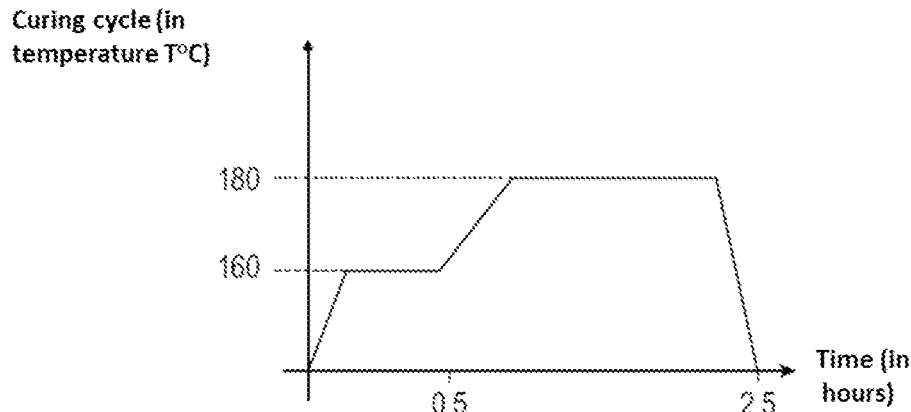
FIG. 2b is a schematic representation of a curing curve as a function of time for the assembly shown in FIG. 2a, FIG. 3 is a schematic representation in layers of an assembly of the metallic reinforcement on the leading edge of the vane with a polymer resin according to the prior art.
Figure 3:
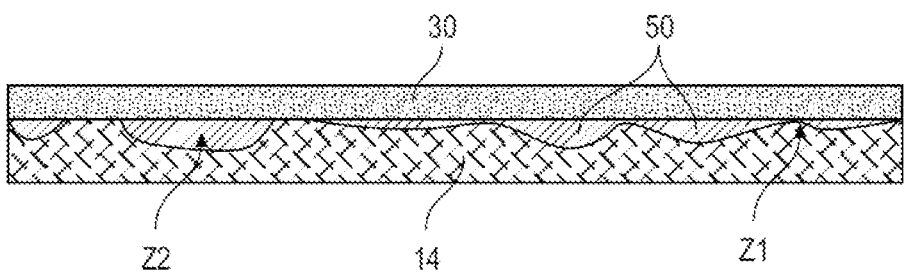

FIGS. 1 to 3 have been described above.

6

The invention is generally applicable to any part made of composite material in which a portion of the fibrous preform is attached to a metallic part without adhesive.

The invention will be described below in the context of its application to a vane made of composite material for a turbomachine, in particular for an aircraft, such as an OGV vane of a turbomachine fan.

Figure 4:
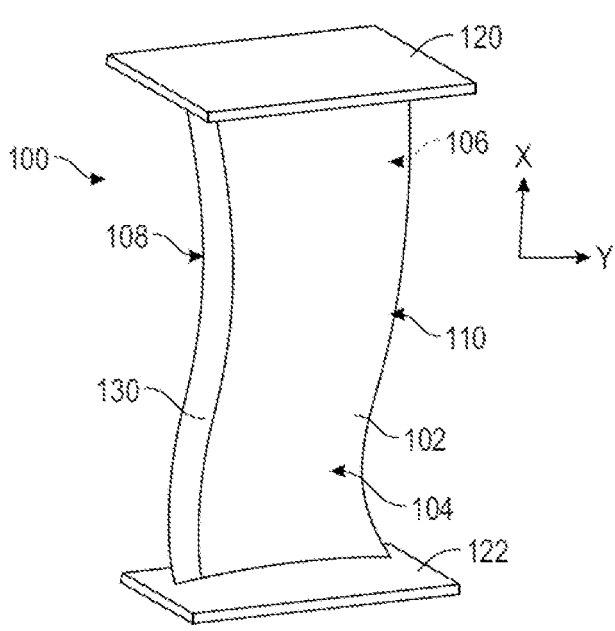
FIG. 4 is a schematic perspective view of a composite material vane comprising a metallic reinforcement in accordance with the invention.

With reference to FIG. 4, the OGV vane 100 extends along an axis X of elongation. This axis X may be substantially perpendicular (radial) or inclined with respect to a longitudinal axis of the turbomachine (not shown in the figures). The vane 100 comprises a blade 102 extending, on the one hand, along the axis X and, on the other hand, along an axis Y. This axis Y is substantially perpendicular to the axis X and parallel to the longitudinal axis of the turbomachine. The blade 102 can have an aerodynamic profile structure to form the aerodynamic portion of the vane 100. The blade 102 comprises an intrados face 104 and an extrados face 106 extending between a leading edge 108 and a trailing edge 110. The blade 102 has a curved profile of variable thickness between its leading edge 108 and its trailing edge 110. The longitudinal ends of the vane 100 are connected to platforms 120, 122 fitted, respectively, to the radial outer end of the blade 102 and to a radial inner end of the blade 102, as described above with reference to FIG. 1.

The vane 100 also comprises a reinforcement or shield 130 to protect the leading edge 108, in the form of a metallic foil. This reinforcement 130 is bonded to the leading edge 108 of the blade 102 using the method described below. The metallic reinforcement 130 extends in height (with respect to the axis X) and over a segment in length (with respect to the axis Y) of an intrados wall 114 of the intrados face 104 and of an extrados wall 116 of the extrados face 106 from the leading edge 108 of the blade 102.

Figure 5:
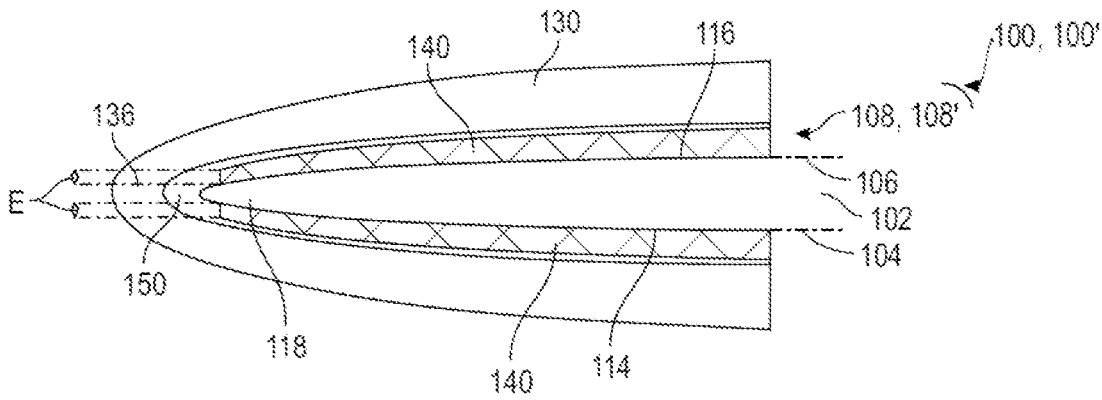
FIG. 5 is a schematic cross-section in the plane Y of the leading edge of the vane in FIG. 4.

With reference to FIG. 5, the metallic reinforcement 130 has a generally elongated shape with a "V" or "U" cross-section (with respect to the axis X). The reinforcement 130 covers the intrados 114 and extrados 116 walls of the leading edge 108 and also a ridge or nose 118 which joins the intrados 114 and extrados 116 walls together.

One of the special characteristics of the invention is that at least one reinforcement support 140 is interposed between the metallic reinforcement 130 and the leading edge 108 of the blade 102. This reinforcement support 140, as described below, is configured to bond the leading edge 108 of the blade 102 to the metallic reinforcement 130 without adhesive.

Advantageously, the reinforcement support 140 at least partially covers the intrados 114 and extrados 116 walls of the leading edge 108 of the blade 102. The reinforcement support 140 may not cover the ridge 118 of the leading edge 108 of the blade 102. In the example shown in FIG. 5, the cured polymeric resin 150 covers the reinforcement support 140 and the ridge 118 so as to secure the metallic reinforcement 130 to the leading edge 108 of the composite blade 102 of the vane 100.

The reinforcement support 140 can be made of a metallic material, for example copper or aluminium. The metallic reinforcement support 140 can also have other secondary functions, such as de-icing.

The reinforcement support 140 can be made of a fibrous material, for example Nylon 66, polyester or glass fibre. The fibrous reinforcement support 140 can be woven, non-woven or knitted.

According to a preferred embodiment of the invention, the reinforcement support 140 is made of a fibrous material, in particular based on nylon 66, for the following advantages:

locally retaining a minimum of bonded seal (i.e. polymer resin), impregnating the empty spaces in the fibrous reinforcement support with the resin (FIG. 9a), optimally distributing the loads in the seal, adapting to the complex geometry of the OGV vane, having a certain flexibility (thanks to the size of the fibres) for an easier handling by an operator, and stabilising the crack propagation at the bonded assembly interface.

The Applicant has carried out experiments to identify the intrinsic properties of a reference seal (such as an epoxy-based resin) for use in bonding the metallic reinforcement and the leading edge of the vane blade to the reinforcement support. This identification can be made using various tests to characterise the mechanical behaviour of the seal, such as modified SCARF tests, TAST (Thick Adherend Shear Test), modified ARCAN, etc.

Figure 6:
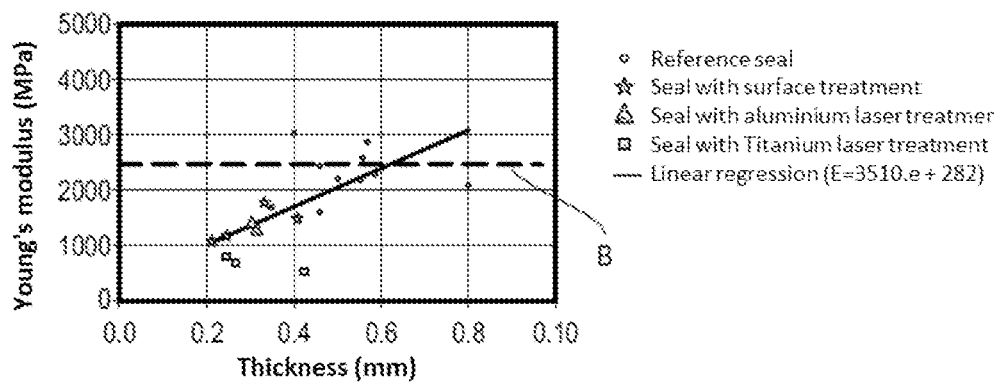
FIG. 6 shows a curve of Young's modulus variation as a function of thickness for several types of bonded seal.

In particular, tests using modified 45° SCARF test specimens were carried out by the Applicant to experimentally characterise the strength and the mechanical behaviour of the seal under several stress modes. Metallic and composite parts are butt-bonded to the reference seal and the treated seals, which are inclined at an angle of 45° to allow a multiaxial loading. For example, the seals can be treated by sanding, laser treatment, chemical treatment such as OAP, etc. In the example shown in FIG. 6, the seals are treated with an OAP, aluminium laser or titanium laser surface treatment. The Young's modulus is then measured for various seal thickness values from 0.20 to 1.00 mm. FIG. 6 shows a linear curve representing the Young's modulus values as a function of the thickness of the seal. The Young's modulus in FIG. 6 can be measured and expressed in Megapascals (MPa). The results in FIG. 6 show an increase in Young's modulus with increasing in the thickness of the seal. In particular, the greater the thickness, the more the Young's modulus of the seal tends towards a value B referred to as "Bulk" (or the mass) of a conventional adhesive. In the example shown in FIG. 6, the Bulk value of the adhesive is approximately 2500 MPa for the thicknesses of 0.20 to 1.00 mm. This Bulk value may be different depending on the type of adhesive used.

Figure 7A:
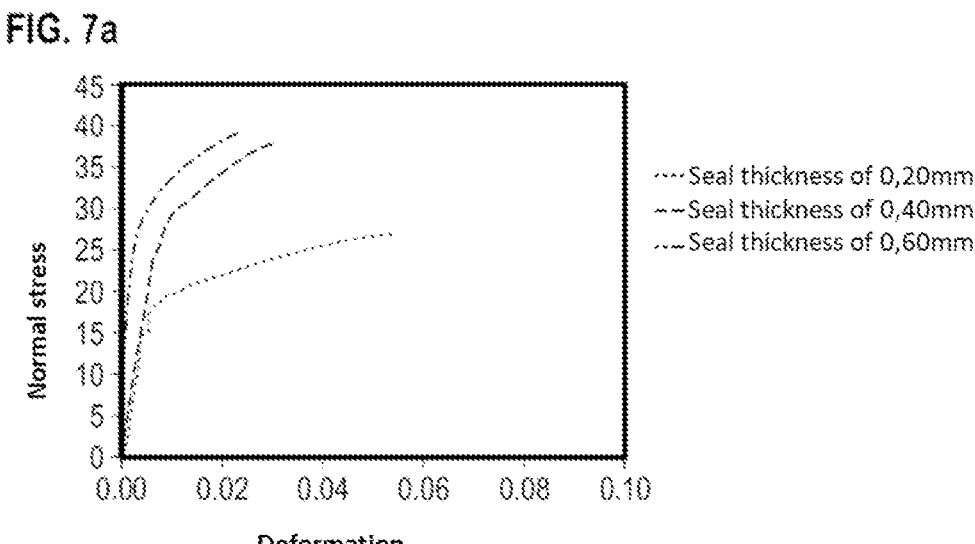
FIG. 7a shows a normal stress/strain curve for different thicknesses of the bonded seal.
Figure 7B:
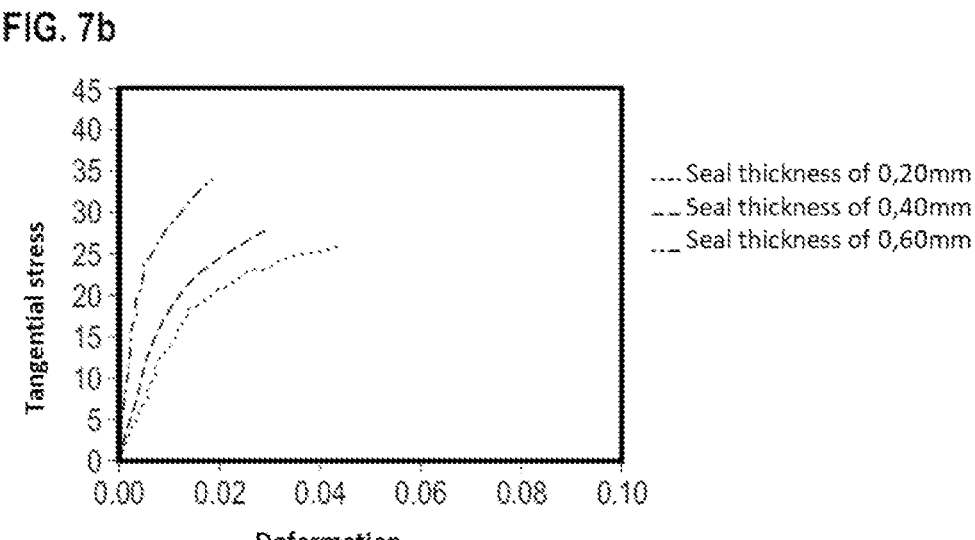
FIG. 7b shows a tangential stress/strain curve for different thicknesses of the bonded seal.

FIG. 7a shows normal tensile (stress/strain) curves as a function of thicknesses of the bonded seal of 200 μm, 400 μm and 600 μm, and FIG. 7b shows tangential tensile curves also as a function of the thicknesses of the seal of 200 μm, 400 μm and 600 μm. In FIGS. 7a and 7b, the normal and tangential stresses can be measured and expressed in Megapascals (MPa), and the (mechanical) deformations of the seal can be determined from length measurements expressed in millimetres (mm). It can be seen that the stresses at normal and tangential failure decrease with increasing in the thickness of the seal. The thicker the bonded seal, the more fragile the bonded seal is.

The term "bonded seal" or "seal" refers to the polymer resin used to secure the metallic support and the edge of the fibrous preform.

From the results in FIGS. 6, 7a and 7b, the optimum mechanical properties (in particular the Young's modulus and the thickness) of the seal (or of the reinforcement support) can be deduced compared with the conventional reference adhesive. The mechanical properties of the bonded seal can also be linked to the thickness of the reinforcement support in the bonded assembly.

The reinforcement support 140 is therefore preferably chosen below the threshold value corresponding to the "Bulk" value of the adhesive. The reinforcement support 140, particularly in the bonded assembly (or at the end of the densification step S50 of the manufacturing method described below), may have a maximum Young's modulus of 2500 MPa. The Young's modulus is advantageously between 1000 and 2000 MPa. By way of example, the Young's modulus of the reinforcement support 140 is of the order of 1300 MPa. These Young's modulus values of the reinforcement support 140 correspond in particular to those of the reinforcement support 140 associated with the metallic reinforcement 130 and at different thicknesses.

The reinforcement support 140 may have a minimum thickness E of 50 μm, where the thickness E is measured along the axis X. This value is measured experimentally and corresponds to a minimum thickness required to obtain a sufficient bonding of the assembly. The thickness E is preferably between 50 μm and 600 μm.

Figure 8:
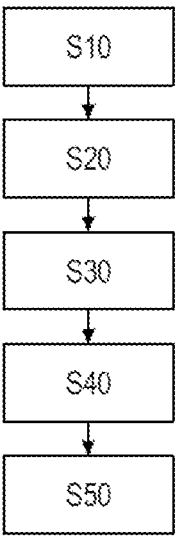
FIG. 8 is a flow chart of a method for manufacturing the vane shown in FIG. 4.

The present application now describes a method for manufacturing the OGV vane 100, successive steps of the method are summarised in FIG. 8, for example.

In accordance with the invention, the method comprises the following steps of:

(S10) three-dimensional fibre weaving to produce a fibrous preform 100' intended in particular to form the blade 102 of the vane 100, (S20) inserting at least one reinforcement support 140 on an edge 108' of the fibrous preform 100', the edge 108 being intended to form the leading edge 108 of the blade 102, (S30) reinforcing the edge 108' of the fibrous preform 100', by integrating a metallic reinforcement 130 on the edge 108', (S40) mounting the assembly (fibrous preform 100', reinforcement support 140 and metallic reinforcement 130) in a mould, (S50) densifying the fibrous preform 100' by a matrix to form the composite material vane 100.

In step (S10), the fibrous preform 100' can be woven in one piece (i.e. from a single piece of material). The fibrous preform 100' can be woven from fibres of carbon, ceramic such as silicon carbide, glass or aramid.

The fibrous preform 100' can also be pre-impregnated with a polymeric resin 150. This resin 150 can be made from a thermosetting or thermoplastic material, for example based on epoxy, polyepoxide, polyimide, polybismaleimide, polyurethane, polyester or vinylester. By way of example, the epoxy-based resin is a commercial reference epoxy PR-250 or PR-2896.

Advantageously, the reinforcement support 140 is placed directly and at least partially on the intrados 114 and extrados 116 walls of the edge 108' of the fibrous preform 100'. In the example shown in FIG. 5, the reinforcement support 140 extends from the ends of the intrados 114 and extrados 116 walls of the edge 108' up to the ridge 118 of the edge 108'. This ridge 118 is opposite the ends of the walls 114, 116. The ridge 118 of the edge 108' is not covered by the reinforcement support 140 because it plays no (or very little) part in the mechanical strength of the bonding. The small size and the compact arcuate shape (curvature generally less than 2 mm) of the ridge 118 are therefore sufficient for carrying out the bonding with polymer resin alone.

In step (S30), the reinforcement support 140 is therefore interposed between the edge 108' of the fibrous preform 100'

Figure 9A:
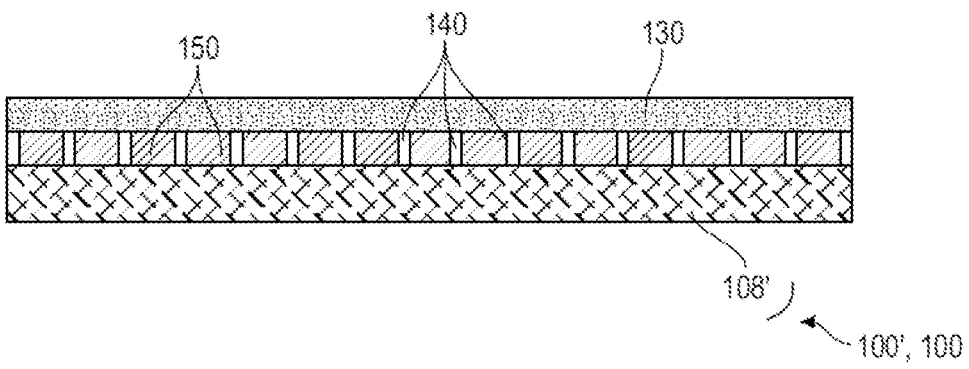
FIG. 9a is a partial schematic cross-sectional representation in the plane Y of an assembly of the metallic reinforcement on the leading edge of the vane with a fibrous reinforcement support and the cured polymer resin according to one embodiment of the invention.

9
10 and the metallic reinforcement 130. Referring to FIG. 9*a*, the resin 150 is also impregnated into the empty spaces of the reinforcement support 140 made of fibrous materials.

In step (S40), the assembly placed in the mould can be sealed with a housing in the shape of the final moulded part.

The step (S50) of densifying the fibrous preform 100' consists in particular in filling the void in the fibrous preform 100' and also in the reinforcement support 140 when it is made of fibrous material, in all or part of the volume of the fibrous preform 100' and reinforcement support 140, with the material constituting the matrix (namely the polymer resin).

The matrix can be obtained using a liquid method, such as the RTM resin transfer moulding method.

The liquid method involves impregnating the fibrous preform with a liquid composition containing an organic precursor of the material of the matrix. The organic precursor is usually in the form of a polymer, such as polymeric resin 150, optionally diluted in a solvent. Then, if the fibrous preform 100' is not pre-impregnated with the resin 150, the resin 150 is injected into the housing of the mould to impregnate the entire fibrous portion of the preform 100' and of the reinforcement support 140 when it is made of fibrous material. A pressure gradient is generally established in this internal space between the resin injection point and the resin evacuation orifices in order to control and optimise the impregnation of the preform by the resin.

The transformation of the resin, i.e. its polymerisation, can be carried out by thermal treatment, generally by heating or curing the mould, after elimination of any solvent and cross-linking of the polymer, the preform still being held in the mould having a shape corresponding to that of the part to be produced. The choice of the temperature class and/or chemical nature of the resin is determined by the thermo-mechanical stresses to which the part must be subjected.

When the temperature is raised to polymerise the resin into a matrix, the resin 150 covers the reinforcement support 140 to harden and form a secured connection at the interface of the fibrous preform 100' and of the metallic reinforcement 130. In particular, the resin 150 envelops the reinforcement support 140 made of metallic material or the resin 150 envelops and passes through the reinforcement support 140 made of fibrous material, so that the matrix formed bonds the edge 108' of the preform 100' and the metallic reinforcement 140 of an uniform thickness.

Figure 9B:
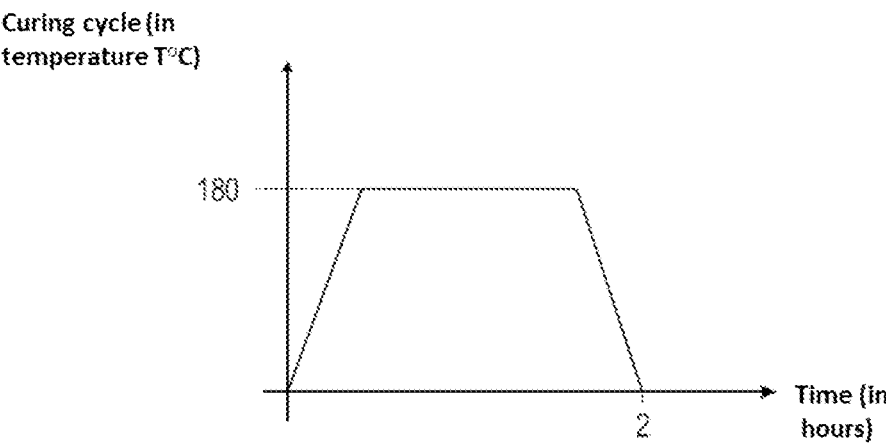

The method according to the invention allows to co-mould (and also to co-inject when the fibrous preform is not pre-impregnated with polymer resin) the reinforcement support 140 interposed between the metallic reinforcement 130 and the edge 108' of the fibrous preform 100', in particular in a curing cycle comprising a single heating stage at 180° C. (FIG. 9*b*). "Co-moulding" or "co-injecting" refers to a single step for moulding several parts or injecting a material simultaneously into the manufacturing method.

After the step (S50) of transforming the resin 150 into a matrix, the formed vane 100 can be demoulded.

In a further step, the vane can be trimmed to remove excess resin and form the final contours of the vane.

However, the invention is not limited to the OGV vanes of a turbomachine fan and can be applied to other shrouded (fan) or non-shrouded (propeller) vanes and stationary or movable vanes of the turbomachine.

The invention claimed is:

1. A method for manufacturing a vane made of composite material for a turbomachine, said vane comprising a blade having an intrados face and an extrados face extending between a leading edge and a trailing edge, the method comprising the steps of:
   weaving fibres in three dimensions so as to produce a fibrous preform,
   reinforcing an edge of said fibrous preform intended to form the leading edge of the blade, by integrating a metallic reinforcement on said edge of the fibrous preform,
   assembling the fibrous preform and the metallic reinforcement in a mould,
   densifying the fibrous preform by a matrix to form the vane made of composite material,
   wherein, before the reinforcing step, the method comprises a step of introducing at least one reinforcement support onto the edge of the fibrous preform, said reinforcement support being configured so as to be interposed between the metallic reinforcement and said edge of the fibrous preform, and in that, in the densification step, said reinforcement support is enveloped with the matrix to bond the edge of the fibrous preform and the metallic reinforcement with a predefined and homogeneous minimum thickness,
   wherein the edge of the fibrous preform comprises an intrados wall and an extrados wall connected together by a ridge, said reinforcement support covers at least a portion of said intrados and extrados walls up to a ridge of the edge of the fibrous preform, and
   wherein the reinforcement support is not covering the ridge of the edge of the fibrous preform.

2. The manufacturing method according to claim 1, wherein the densification step comprises impregnating the fibrous preform with a resin and transforming the resin into a matrix by thermal treatment.

3. The manufacturing method according to claim 2, wherein the resin is injected into the fibrous preform before the densification step, or the fibrous preform is previously impregnated with the resin in the weaving step.

4. The manufacturing method according to claim 2, wherein the resin is made from a thermosetting or thermoplastic material.

5. The manufacturing method according to claim 1, wherein the reinforcement support is made of a metallic material.

6. The manufacturing method according to claim 5, wherein, in the densification step, the resin envelops the reinforcement support made of metallic material.

7. The manufacturing method according to claim 1, wherein the reinforcement support is made of a fibrous material.

8. The manufacturing method according to claim 7, wherein, in the densification step, the resin envelops and passes through the reinforcement support made of fibrous material.

9. The manufacturing method according to claim 7, wherein said fibrous material is woven, non-woven or knitted.

10. The manufacturing method according to claim 1, wherein said reinforcement support has a minimum thickness E of 50 μm.

11. The manufacturing method according to claim 1, wherein, at the end of the densification step, said reinforcement support has a maximum Young's modulus of 2500 MPa.

12. The manufacturing method according to claim 1, wherein the densification step is carried out with a curing cycle comprising a single heating stage.

13. The manufacturing method according to claim 1, wherein the reinforcement support enveloped with the matrix is arranged in a uniform and regular manner along an interface between bonded edge of the fibrous preform and the metallic reinforcement.

14. The manufacturing method according to claim 1, wherein a cured polymeric resin covers the reinforcement support and the ridge.

\* \* \* \* \*